United States Patent [19]

Dominique et al.

[11] Patent Number: 5,282,394
[45] Date of Patent: Feb. 1, 1994

[54] LOW PIVOT STEERING COLUMN TILT MECHANISM

[75] Inventors: Alexander L. Dominique, Rochester Hills; Wayne L. Grubaugh, Jr., Northville; Michael F. Halacka, Bloomfield Hills; James P. Badhorn, Troy; Robert A. Welchko, St. Clair; Kenneth G. Kamm, Temperance, all of Mich.

[73] Assignee: Chrysler Corporation, Highland Park, Mich.

[21] Appl. No.: 971,637

[22] Filed: Nov. 5, 1992

[51] Int. Cl.⁵ .............................................. B26D 1/16
[52] U.S. Cl. ........................................ 74/493; 74/527; 403/24; 403/97; 403/311; 403/368
[58] Field of Search ............... 74/493, 495, 498, 527, 74/533; 280/775; 403/24, 97, 311, 314, 368, 374

[56] References Cited

U.S. PATENT DOCUMENTS

| | | | |
|---|---|---|---|
| 1,623,493 | 4/1927 | Postlethwait | 74/493 |
| 2,185,779 | 1/1940 | Tveidt | 74/493 |
| 2,903,904 | 9/1959 | Mackie | 74/493 |
| 3,533,302 | 10/1970 | Hansen | 74/493 |
| 3,628,396 | 12/1971 | Grobowski | 74/493 |
| 4,472,982 | 9/1984 | Nishikawa | 74/493 |
| 4,732,050 | 3/1988 | Vollmer | 74/493 |
| 4,774,851 | 10/1988 | Iwanami et al. | 74/493 |
| 4,993,279 | 2/1991 | Doescher et al. | 74/493 |
| 5,009,120 | 4/1991 | Iseler et al. | 74/493 |
| 5,029,489 | 7/1991 | Burmeister et al. | 74/493 |
| 5,052,240 | 10/1991 | Miyoshi et al. | 74/493 |

*Primary Examiner*—Rodney H. Bonck
*Assistant Examiner*—William O. Trousdell
*Attorney, Agent, or Firm*—Edward A. Craig

[57] ABSTRACT

A tilt mechanism for a steering column is pivotally attached to vehicle structure including a bracket member attached to vehicle structure, a collar disposed within the bracket member and adapted to receive the steering column, and structure disposed between the bracket member and the collar for selectively positioning the collar relative to the bracket member.

13 Claims, 3 Drawing Sheets

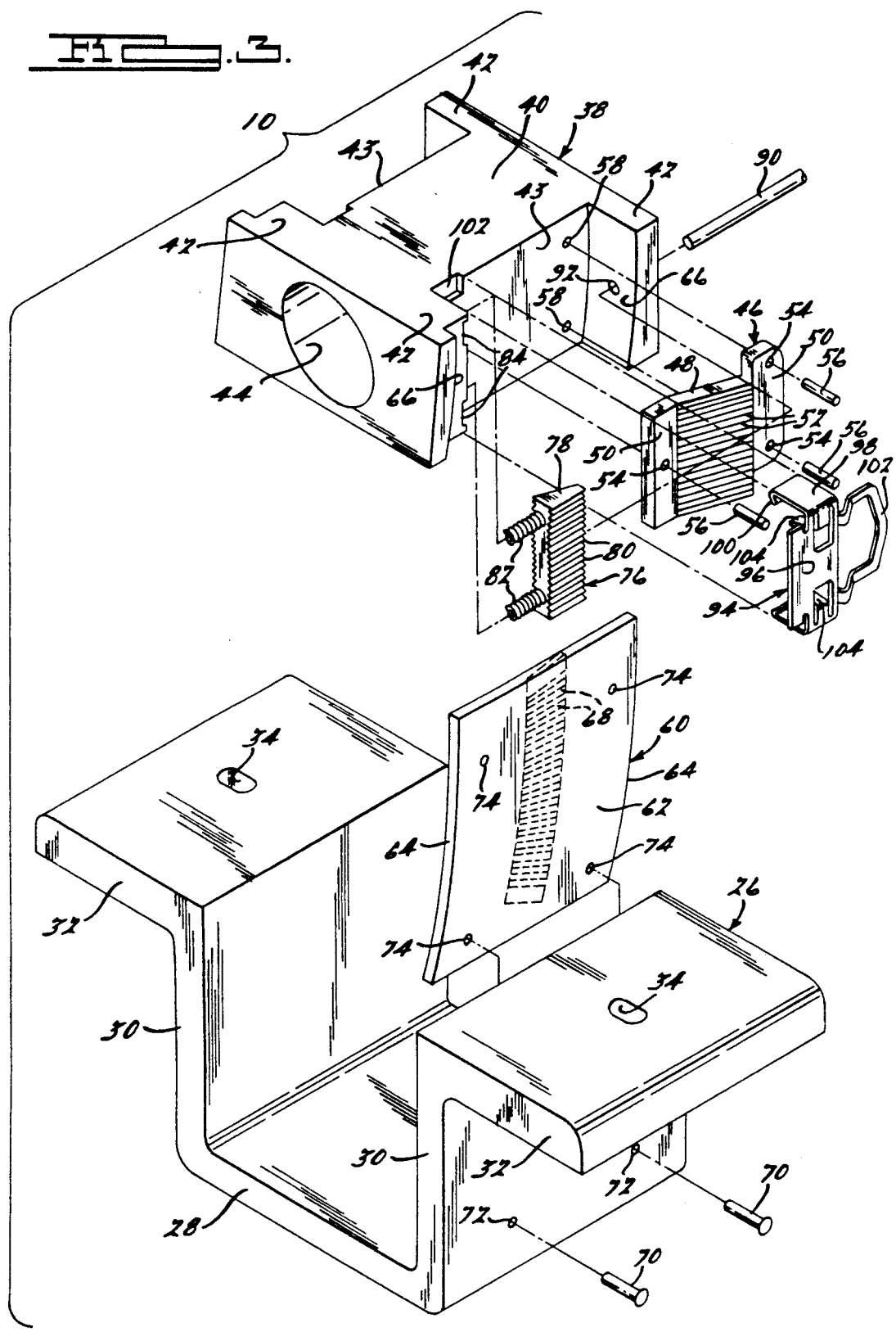

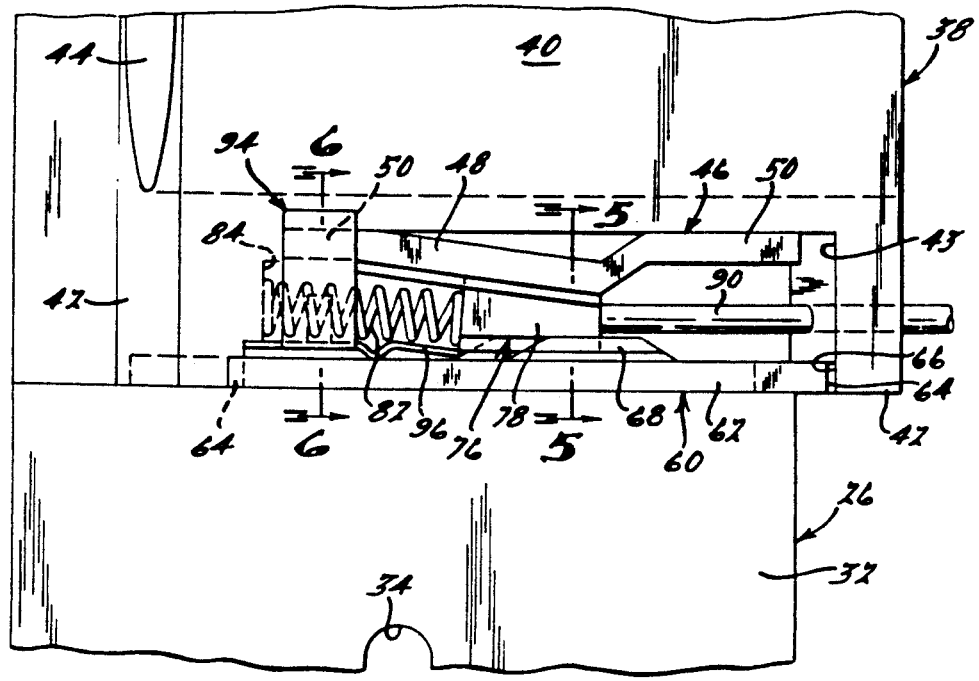
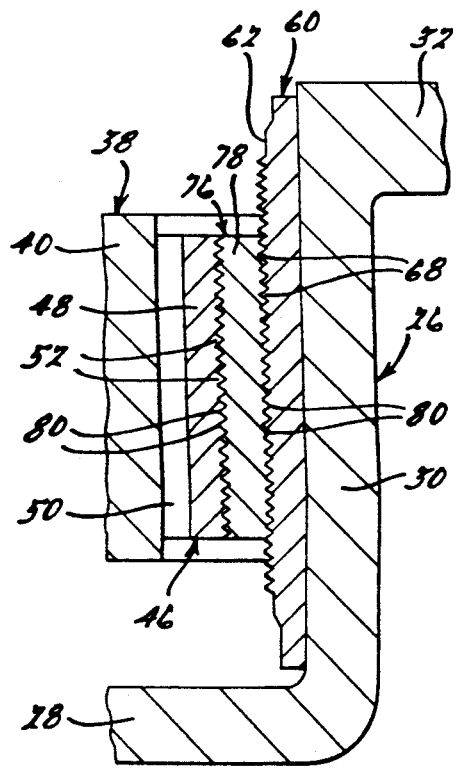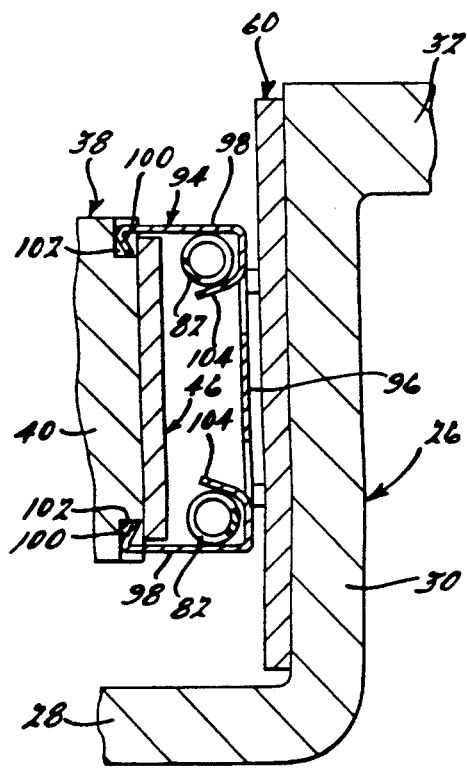

LOW PIVOT STEERING COLUMN TILT MECHANISM

BACKGROUND OF THE INVENTION

1. Field of the Invention

The present invention relates generally to steering columns for vehicles, and more particularly to a tilt mechanism for a steering column of an automotive vehicle.

2. Description of the Related Art

In a steering column of an automotive vehicle, a steering shaft has a steering wheel at one end. The steering shaft is extended through a rigid sleeve and rotatable therein. The steering column may be of a tilt or non-tilt type. In a conventional non-tilt steering column, the steering column is held in a fixed position typically by a pair of brackets attached to vehicle structure. In a conventional tilt steering column, the steering column is still held in place by the pair of brackets with a pivot mechanism adjacent the steering wheel. The disadvantage of this tilt steering column is the cost of a joint for a two-piece steering shaft and sleeve construction. Thus, there is a need in the art to permit the entire steering shaft and sleeve to tilt, thus avoiding the need for a two-piece construction.

One attempt to fulfill the above-identified need was to provide a low pivot steering column. In a low pivot steering column, a one-piece steering shaft is extended through a rigid sleeve which is pivotally attached at its lower end by a bracket to vehicle structure. The upper end of the sleeve is attached to vehicle structure by a tilt mechanism. An example of such a low pivot steering column is disclosed in U.S. Pat. No. 2,185,779 to Tveidt. One disadvantage of this patented steering column is that the tilt mechanism is of a clamping type which requires manual adjustment and is undesired. Another example of a low pivot steering column is disclosed in U.S. Pat. No. 4,993,279 to Doescher et al. One disadvantage of this patented steering column is that the tilt mechanism uses a pivotal latch member to engage and disengage spaces in a rack which requires manual adjustment and is undesired. Thus, there is a need in the art to provide a tilt mechanism for a low pivot steering column which has automatic adjustment and a relatively low cost.

SUMMARY OF THE INVENTION

It is, therefore, one object of the present invention to provide a tilt mechanism for a steering column.

It is another object of the present invention to provide a tilt mechanism for a steering column which eliminates the need for a two-piece steering shaft and sleeve construction.

It is yet another object of the present invention to provide a tilt mechanism for a low pivot steering column.

It is still another object of the present invention to provide a tilt mechanism for a low pivot steering column which provides automatic adjustment.

It is a further object of the present invention to provide a relatively low cost tilt mechanism for a steering column.

To achieve the foregoing objects, the present invention is a tilt mechanism for a steering column being pivotally attached to vehicle structure. The tilt mechanism includes a bracket member attached to vehicle structure and a collar disposed within the bracket member and adapted to receive the steering column. The tilt mechanism also includes means disposed between the bracket member and the collar for allowing tilting and selectively positioning of the steering column.

One advantage of the present invention is that a tilt mechanism is provided for a steering column of an automotive vehicle. Another advantage of the present invention is that a tilt mechanism is provided for a low pivot steering column. Yet another advantage of the present invention is that a two-piece steering shaft and sleeve construction is eliminated. Still another advantage of the present invention is that a low pivot steering column tilt mechanism has automatic adjustment, thereby eliminating manual adjustment of clamping and pivotal latch mechanisms. A further advantage of the present invention is that a relatively low cost tilt mechanism for a steering column is provided.

Other objects, features and advantages of the present invention will be readily appreciated as the same becomes better understood after reading the following description taken in conjunction with the accompanying drawings.

BRIEF DESCRIPTION OF THE DRAWINGS

FIG. 3 is an exploded perspective view of the tilt mechanism of FIGS. 1 and 2.

FIG. 4 is a plan view of the tilt mechanism of FIGS. 1 and 2.

FIG. 5 is a sectional view taken along lines 5—5 of FIG. 4.

FIG. 6 is a sectional view taken along lines 6—6 of FIG. 4.

DESCRIPTION OF THE PREFERRED EMBODIMENT(S)

Figure 1:
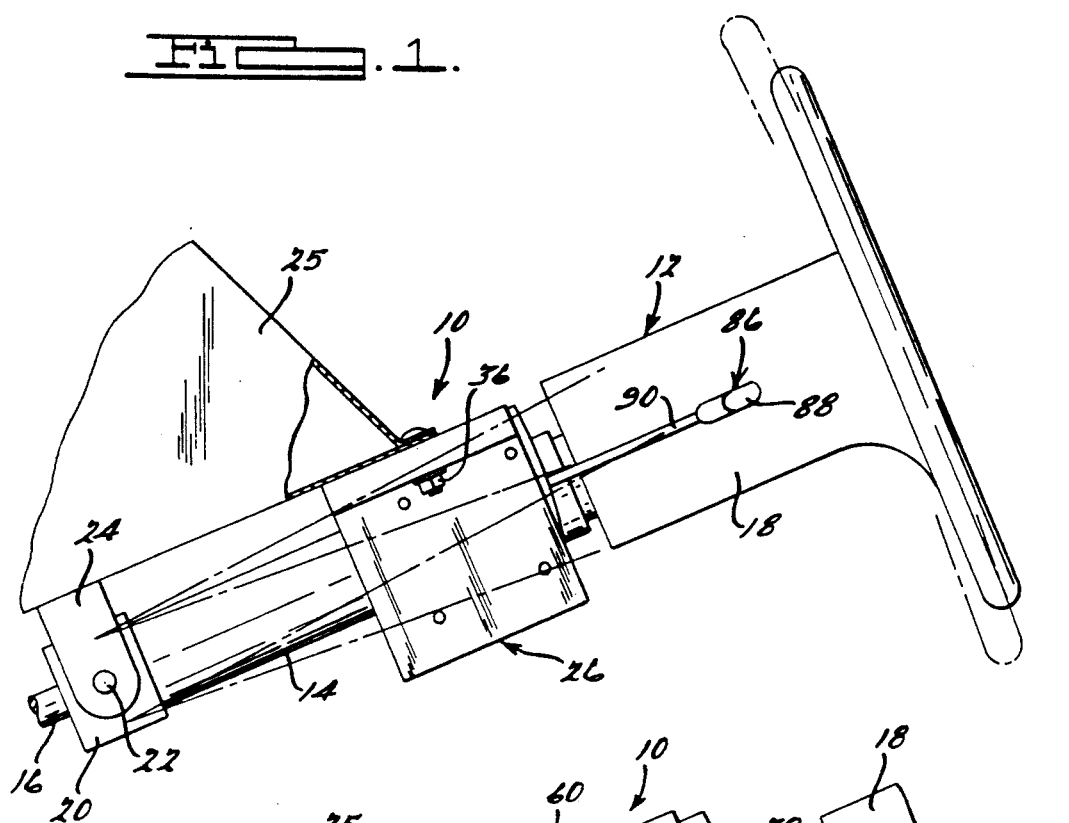
FIG. 1 is a partial elevational view of tilt mechanism according to the present invention illustrated in operational relationship to a steering column of a vehicle.

Referring now to the drawings, especially FIG. 1, a tilt mechanism is generally shown at 10 in operational relationship with a steering column, generally indicated at 12, for a vehicle such as an automotive vehicle (not shown). The steering column 12 includes a rigid sleeve 14 and a steering shaft 16 which extends through the rigid sleeve 14 and is connected to a steering wheel assembly 18 at its upper end and to a shaft coupler (not shown) at its lower end. It should be appreciated that the shaft coupler is operably connected to a steering gear assembly (not shown) for steering of the wheels of the automotive vehicle. The lower end of the steering column 12 is passed through a collar 20 which is pivotally or rotatably attached at 22 to a brake pedal or lower support bracket 24. The lower support bracket 24 is fixedly attached to vehicle support structure such as a dash panel 25 by suitable means such as welding. It should be appreciated that any suitable means may be provided to pivotally or rotatably attach the lower end of the sleeve 14 to the dash panel 25.

Figure 2:
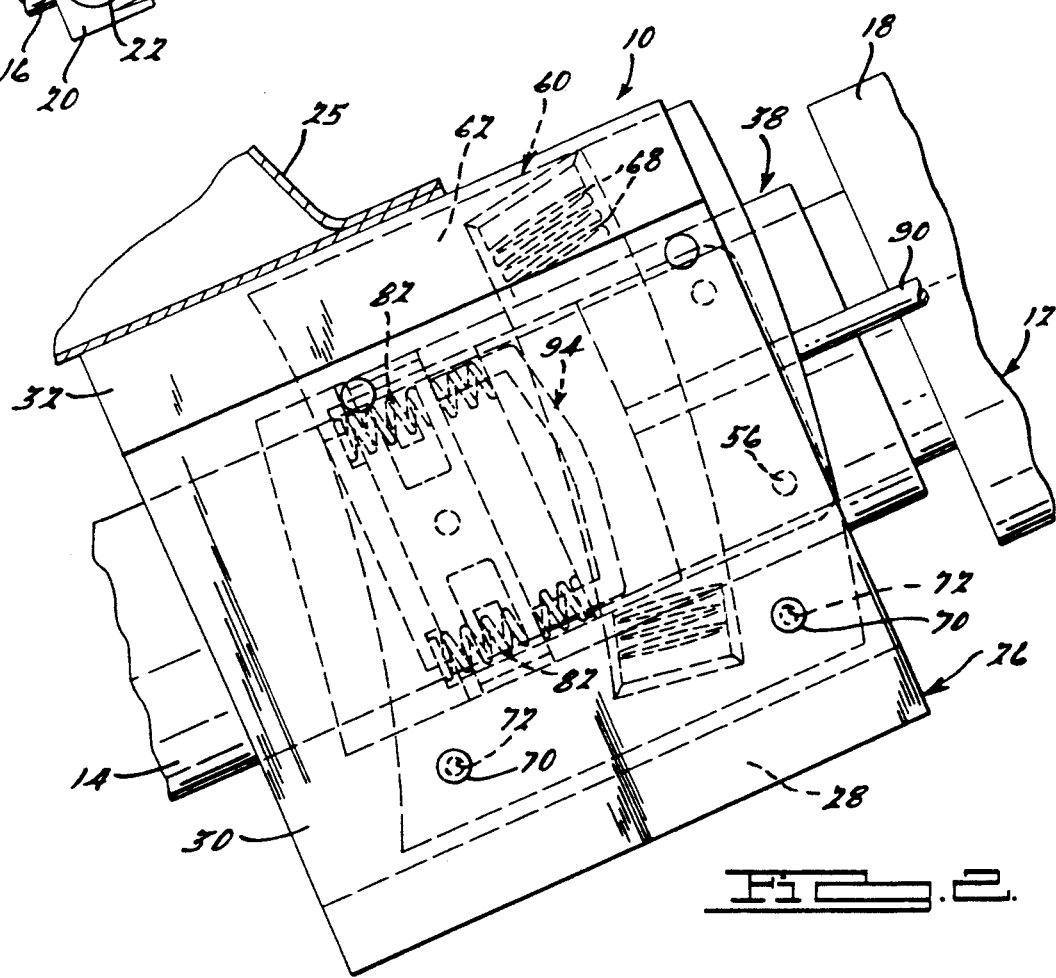
FIG. 2 is an enlarged view of the tilt mechanism of FIG. 1.

Referring to FIGS. 1 through 3, the tilt mechanism 10 includes a bracket member, generally indicated at 26. The bracket member 26 has a generally planar base wall 28 and side walls 30 extending generally perpendicular to the base wall 28 to form a generally U-shaped cross-section. The bracket member 26 includes flanges 32 extending outwardly generally perpendicular to the side walls 30. The flanges 32 include an aperture 34 extending therethrough. The bracket member 26 is secured to the dash panel 25 by suitable means such as fasteners 36 which pass through the apertures 34.

The tilt mechanism 10 also includes a collar, generally indicated at 38, for receiving the steering column 12. The collar 38 has a generally rectangular and longitudinally extending body 40 and end flanges 42 extending generally lateral and perpendicular to form a generally I-shaped member. The body 40 and end flanges 42 form a generally rectangular shaped pocket 43 along each side thereof. The collar 38 includes a passageway 44 extending longitudinally through the body 40 through which the rigid sleeve 14 extends. It should be appreciated that the collar 38 is disposed within the bracket member 26.

The tilt mechanism 10 includes a collar rack, generally indicated at 46. The collar rack 46 has an inclined portion 48 and a pair of longitudinally extending flange portions 50. The inclined portion 48 includes a plurality of teeth 52 extending longitudinally and spaced laterally therealong for a function to be described. Each flange portion 50 includes at least one aperture 54 extending therethrough. The collar rack 46 is disposed in the pocket 43 and secured to body 40 of the collar 38 by suitable means such as dowels 56 which pass through the apertures 54 and corresponding apertures 58 in the body 40. It should be appreciated that the inclined portion 48 faces away from the steering wheel assembly 18. It should also be appreciated that the collar rack 46 may be integral with the collar 38.

The tilt mechanism 10 also includes a bracket rack, generally indicated at 60. The bracket rack 60 has a generally planar plate member 62 with arcuate sides 64. The arcuate sides 64 mate with corresponding arcuate edges 66 on the collar 38. The bracket rack 60 includes a plurality of teeth 68 spaced along an arc and extending radially therealong. Preferably, the teeth 68 are "football" shaped for a function to be described. The bracket rack 60 is secured to a side wall 30 of the bracket member 26 by suitable means such as pins 70 which pass through apertures 72 in the side wall 30 and the apertures 74 in the bracket rack 60. It should be appreciated that the teeth 68 extend laterally and radially away from the steering wheel assembly 18. It should also be appreciated that the bracket rack 60 may be integral with the bracket member 26.

The tilt mechanism 10 includes a wedge rack, generally indicated at 76. The wedge rack 76 includes a wedge member 78 having a trapezoidal shape with a plurality of teeth 80 along each side thereof. The teeth 80 extend longitudinally and are spaced laterall therealong. The wedge rack 76 is disposed between the collar rack 46 and bracket rack 60 such that the teeth 80 engage the teeth 52 and 68 of the collar rack 46 and bracket rack 60, respectively, as illustrated in FIG. 5.

Referring to FIGS. 2 through 6, the tilt mechanism 10 includes at least one, preferably a pair of springs 82 for urging the wedge rack 76 into engagement with the collar rack 46 and bracket rack 60. Preferably, the springs 82 are coil springs having a predetermined length and spring force. The springs 82 have one end disposed in corresponding recesses 84 in the end flange 42 and another end which abuts the wedge member 78. It should be appreciated that the springs 82 may have one end secured to the wedge member 78.

As illustrated in FIG. 1, the tilt mechanism 10 further includes an actuator mechanism, generally indicated at 86, for moving the wedge rack 76 between engagement and disengagement with the collar rack 46 and bracket rack 60. The actuator mechanism 86 includes a tilt lever 88 pivotally connected to a rod member 90. The rod member 90 extends through an aperture 92 in the end flange 42 nearest the steering wheel assembly 18 and has an end which abuts the wedge member 78. It should be appreciated that the rod member 90 may be connected to wedge member 78 by suitable means such as by a threaded engagement. It should also be appreciated that the tilt lever 88 may be spring loaded by a spring (not shown) to automatically return the tilt lever 88 to its original position after movement or actuation thereof.

Referring again to FIGS. 2 through 6, the tilt mechanism 10 includes a retainer, generally indicated at 94. The retainer 94 retains the wedge rack 76 from lateral movement during disengagement of the wedge rack 76 from the collar rack 46 and bracket rack 60. The retainer 94 has a generally planar base wall 96 and side walls 98 extending generally perpendicular to the base wall 96 to form a generally U-shaped cross-section. The retainer 94 includes flanges 100 extending outwardly generally perpendicular to the side walls 98. The flanges 100 are disposed over the flange 50 of the collar rack 46 and into corresponding recesses 102 in the body 40. The retainer 94 includes a pair of laterally spaced interior walls 104 extending from the base wall 96 to retain the springs 82 between the side walls 98 and interior walls 104. The retainer 94 also includes a generally C-shaped end wall 106 extending laterally from the base wall 96.

During assembly of the tilt mechanism 10, the retainer 94 is disposed over a flange 50 of the collar rack 46 and disposed in the pocket 43 such that the flanges 100 are disposed in the recesses 102. The collar rack 46 is secured to the body 40 by the dowels 56. The springs 82 are inserted in the retainer 94 between the side walls 98 and interior walls 104. The wedge rack 76 is disposed between the retainer 94 and the collar rack 46 and the springs 82 are compressed. The bracket rack 60 is disposed between the side walls 30 of the bracket member 26 and secured to one side wall 30 by the pins 72. The collar 38 is then disposed between the side walls 30 of the bracket member 26. The rod member 90 is extended through the aperture 92 in the collar 38 and the wedge rack 76 is released to abut the rod member 90 and engage the collar rack 46 and the bracket racks 60. It should be appreciated that the tilt mechanism 10 may include similar components in the other pocket 43 to provide dual actuation.

In operation, the tilt lever 88 on the steering wheel assembly 18 is moved or actuated longitudinally by the operator, in turn, moving the rod member 90 toward the tilt mechanism 10. The rod member 90 pushes or moves the wedge rack 76 longitudinally along the teeth 52 of the collar rack 46 such that the other set of teeth 80 of the wedge rack 76 disengage the teeth 68 of the bracket rack 60. With the springs 82 compressed and the wedge rack 76 in a disengaged position, the operator may pivot or tilt the steering column 12 as illustrated in FIG. 1. Pivotal movement or rotation of the steering column 12 by the operator in turn, pivots or rotates the collar 38 relative to the bracket member 26. Once the steering column 12 is in a selected or desired position, the tilt lever 88 is released by the operator. The springs 82 automatically move the wedge rack 76 toward the steering wheel assembly 18. The "football" shaped teeth 68 allow the teeth 80 on the wedge rack 76 to easily engage therewith and the teeth 52 of the collar rack 46. The operation may be repeated.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A tilt mechanism for a steering column being pivotally attached to vehicle structure, comprising:
   a bracket member attached to vehicle structure;
   a collar disposed within said bracket member and adapted to receive a steering column;
   a collar rack secured to said collar having a plurality of first teeth;
   a bracket rack secured to said bracket member having a plurality of second teeth; and
   means comprising a wedge rack having a plurality of third teeth for engaging and disengaging one of said first and second teeth disposed between said bracket member and said collar for allowing tilting and selectively positioning of the steering column.

2. A tilt mechanism as set forth in claim 1 including means for urging said wedge rack into engagement with said collar rack and said bracket rack.

3. A tilt mechanism as set forth in claim 2 wherein said urging means comprises at least one spring disposed between said collar and said wedge rack.

4. A tilt mechanism as set forth in claim 1 including a retainer for retaining said wedge rack from lateral movement when said wedge rack is disengaged with said bracket rack when slid longitudinally along said collar rack.

5. A tilt mechanism as set forth in claim 1 including actuating means for moving said wedge rack into disengagement with said bracket rack.

6. A tilt mechanism as set forth in claim 1 wherein said collar includes a body and end flanges extending laterally from said body to form a pocket therebetween.

7. A tilt mechanism as set forth in claim 1 wherein said collar rack has an inclined portion and flanges extending longitudinally from said inclined portion.

8. A tilt mechanism for a steering column being pivotally attached to vehicle structure, comprising:
   a bracket member attached to vehicle structure;
   a collar disposed within said bracket member and adapted to receive the steering column;
   a collar rack secured to said collar having a plurality of first teeth;
   a bracket rack secured to said bracket member having a plurality of second teeth; and
   a wedge rack having a plurality of third teeth for engaging and disengaging one of said first and second teeth to allow said collar to be moved and positioned relative to said bracket member.

9. A tilt mechanism as set forth in claim 8 including means for urging said wedge rack into engagement with said collar rack and said bracket rack.

10. A tilt mechanism as set forth in claim 9 wherein said urging means comprises at least one spring disposed between said collar and said wedge rack.

11. A tilt mechanism as set forth in claim 10 including a retainer for retaining said wedge rack from lateral movement when said wedge rack is disengaged with said bracket rack.

12. A tilt mechanism as set forth in claim 11 including actuating means for moving said wedge rack into disengagement with said bracket rack.

13. A tilt mechanism for a steering column being pivotally attached to vehicle structure, comprising:
   a bracket member attached to vehicle structure;
   a collar disposed within said bracket member and adapted to receive the steering column, said collar includes a body and end flanges extending laterally from said body to form a pocket therebetween;
   a collar rack disposed in said pocket and secured to said collar having a plurality of first teeth;
   a bracket rack secured to said bracket member having a plurality of second teeth;
   a wedge rack disposed in said pocket and having a plurality of third teeth for engaging and disengaging said first and second teeth;
   at least one spring disposed in said pocket between said collar and said wedge rack for urging said wedge rack into engagement with said collar rack and said bracket rack;
   a retainer disposed in said pocket for retaining said wedge rack from lateral movement when said wedge rack is disengaged with said bracket rack; and
   actuating means for moving said wedge rack into disengagement with said bracket rack.

* * * * *